July 24, 1962 E. SCHMIDT 3,046,069
RING SEGMENT SEAL CONSTRUCTION FOR ROTOR SIDE
FACES IN ROTARY POSITIVE DISPLACEMENT
INTERNAL COMBUSTION ENGINES
Filed June 29, 1961
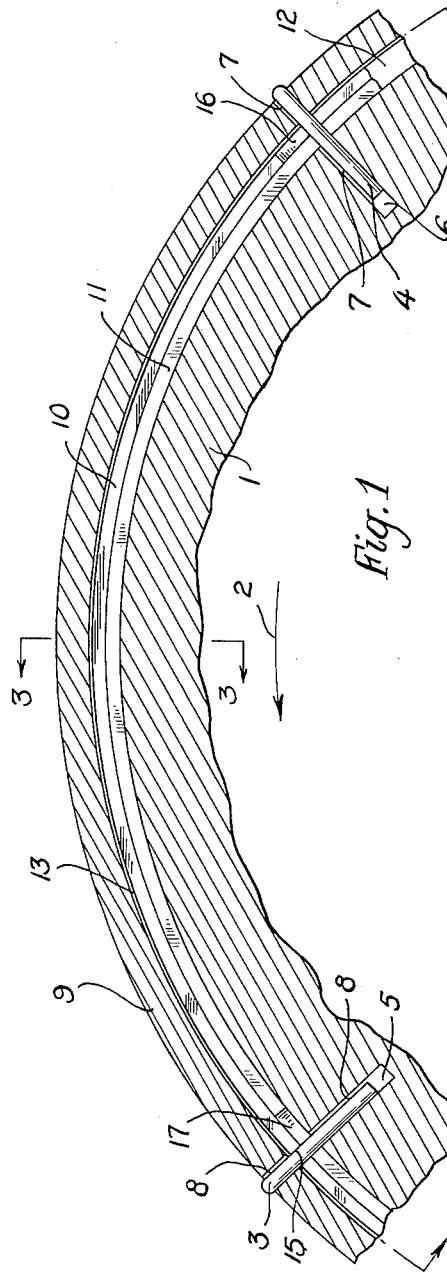
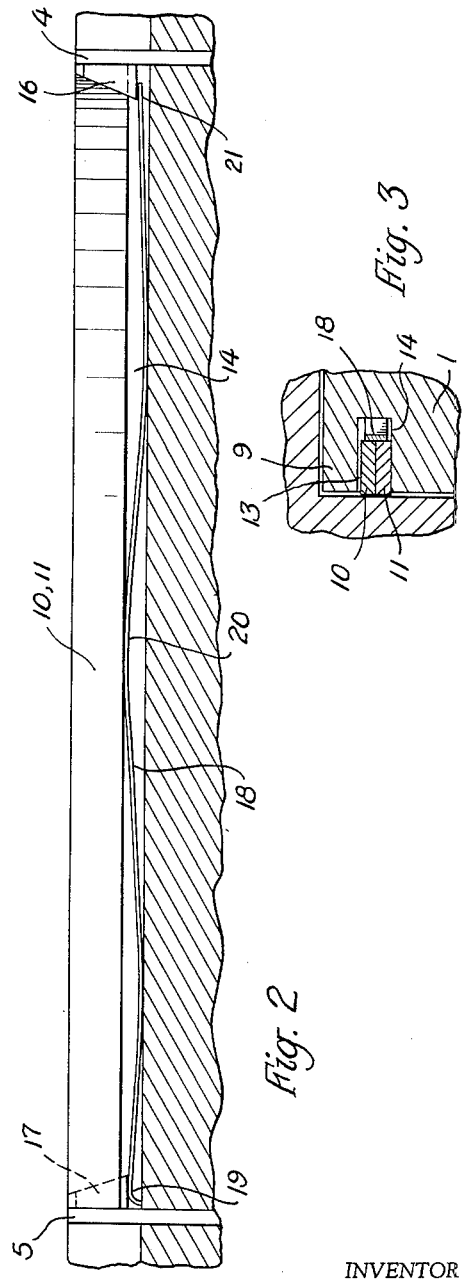
INVENTOR
Ernst Schmidt
BY Bailey, Stephens & Huettig
ATTORNEYS 3,046,069
RING SEGMENT SEAL CONSTRUCTION FOR ROTOR SIDE FACES IN ROTARY POSITIVE DISPLACEMENT INTERNAL COMBUSTION ENGINES
Ernst Schmidt, Nurnberg, Germany, assignor to Maschinenfabrik Augsburg-Nurnberg A.G., Nurnberg, Germany
Filed June 29, 1961, Ser. No. 120,572
Claims priority, application Germany July 30, 1960
3 Claims. (Cl. 309—1)

This invention relates to a rotary positive displacement internal combustion engine. In particular, the invention is directed to means for making a gas tight seal between the side faces of the rotor and the inner surfaces of the casing.

Sealing in this type of engine has posed great difficulties. This is because of the pecularities of these designs where in addition to the radial sealing of the apices or lobes of the rotor against the curved inner surfaces of the casing it is necessary to provide axial sealing of the flat sides of the rotor against the side covers of the engine resulting in what may be termed a corner seal. Moreover, the running of the engine, centrifugal and frictional forces of varying direction and intensity are imposed on the sealing elements and, furthermore, different temperatures occur at the points of contact between the sealing elements and the casing wall.

Heretofore rotors were usually sealed by means of sealing strips combined with differently shaped elements as, for example, grooved cylindrical elements fitted rather tightly into recesses of the rotor. However, it has been found that such elements cannot be economically made to such fine tolerances that the sealing elements can be fitted together without clearances. This means that such constructions do not produce a complete seal.

For example, up to the present, the sealing arrangement at each apex of the rotor has consisted in curved sealing strips fitted into grooves in the flat side faces of the rotor, a sliding vane contacting the curved path of the casing and a recessed cylinder providing the joint. However, great difficulties in making these sealing elements exist because of the numerous tolerances which have to be considered.

In addition, such an engine construction often produces a flutter in the radially directed sealing vanes in the apices of the rotors, which flutter causes scoring and grooving of the contacting surfaces such as to cause a breakdown of the engine if not eliminated. Also, it has been found that in addition to flutter of the vanes in a radial direction, there is flutter circumferentially directed because of the varying gas pressures in front of and behind the radial sealing vanes. In addition to scoring, such flutter produces excessive wear in the sealing vane grooves, such that the clearances become greater and sealing ineffective.

The object of this invention is to produce a seal means which lends itself better to production, effectively seals, and minimizes the tendency of the radial sealing vane to flutter and thus avoids harmful scoring and grooving of the contacting surfaces. According to this invention, the sealing strips for the flat sides of the rotor are formed of preferably two ring segments placed on top of each other which extend between the radial sealing vanes. Each ring segment has one end bevelled and the other square. At the bevelled end it is spaced by a wedge from the adjacent radial sealing vane. With the square end it directly abuts the radial sealing vane. The two ring segments are arranged with the bevelled ends opposite each other so that there is a wedge against each radial vane. The ring segments and wedges are spring-loaded by preferably a common spring. This configuration forms a straightforward no-gap seal at each joint of the ring segments and the radial sealing vanes and the objectional flutter is positively avoided.

The means by which the objects of the invention are obtained are described more fully with respect to the accompanying drawings, in which:

FIGURE 1 is a cross-sectional view through a portion of a rotor;

FIGURE 2 is a cross-sectional view taken along the line 2—2 of FIGURE 1; and

FIGURE 3 is a cross-sectional view taken generally on the line 3—3 of FIGURE 1.

As shown in FIGURE 1, the rotor 1 is indicated as being rotated in the direction of the arrow 2. Extending in a radial direction through the periphery of the rotor is a leading sealing vane 3 and a trailing sealing vane 4, each of which is slidably mounted in slots 5 and 6, respectively, with a slide clearance 7 and 8. These radially directed vanes are located at the tips of the lobes of the rotor, which are the apices of a triangle when the rotor is basically in the shape of an equilateral triangle. Spaced from the outer edge of the rotor by land 9 are a pair of ring segments 10 and 11 which with their square ends abut against one side of each radial sealing vane. These ring segments are fitted closely in the groove with only a slide clearance 13 which is exaggerated in FIGURE 1 for purpose of illustration.

As shown in FIGURES 2 and 3, the ring segments 10 and 11 are separated from the bottom of groove 12 by a space 14.

Ring segment 10 has one square end 15 which bears against radial sealing vane 3. The opposite end of ring segment 10 is bevelled and bears against the correspondingly bevelled side of a wedge 16 which, in turn, has a square side bearing against radial vane 4. Ring segment 11, which lies radially inwardly of ring segment 10, has a similar construction in reversed order, that is, the square end of inner ring segment 11 bears directly against radial sealing vane 4 while the bevelled end of this ring segment bears against the bevelled side of wedge 17, said wedge, in turn, bearing against radial sealing vane 3. Ring segments 10 and 11, as well as the two wedges 16 and 17, are forced outwardly and against the wall of the engine casing by means of a common curved leaf spring 18 which is seated on the bottom of groove 12 in space 14.

Spring 18 contacts wedge 17 and ring segments 10 and 11 at the points 19, 20 and 21, respectively, with forces which are so related to each other as to produce a gas tight seal in conjunction with the radial sealing vanes 3 and 4 but, at the same time, controls movement of radial sealing vanes 3 and 4 to prevent flutter while allowing them to slide for producing a radial seal against the engine casing. Thus the flat sides of the rotor as well as the peripheral surface thereof are effectively sealed. At the same time, the wave form of the spring can be selected so that the oscillation characteristic assists in eliminating flutter of the sealing vanes 3 and 4.

Having now described the means by which the objects of the invention are obtained, I claim:

1. A ring segment seal construction for the side faces of the rotor in a rotary positive displacement internal combustion engine extending between the radial sealing vanes in the apices of the rotor comprising arc-shaped ring segments radially superimposed on each other in a rotor groove with each having one bevelled end and one square end opposite each other extending between the radial sealing vanes, a direct contact between each square end and the adjacent radial sealing vane, wedges between each bevelled end and the adjacent radial sealing vane, and spring means at the bottom of the rotor groove accommodating the ring segments to force the ring segment and said wedges outwards axially against the inner side surfaces of the casing.

2. A ring segment seal construction as in claim 1 said spring means comprising a single wave-like leaf spring applying a pressure against both the ring segments and the wedges.

3. A ring segment seal construction as in claim 2, said spring contacting the ring segments and the wedges at such selected points that the oscillation characteristic of the spring assists the stabilising action of the wedges in preventing flutter of the radial sealing vanes.

No references cited.